Oct. 5, 1965 J. L. HUTSON 3,210,571

POWER CONTROL CIRCUIT UTILIZING CONTROL RECTIFIERS WITH ADJUSTABLE REACTANCE IN THE GATING CIRCUIT

Filed May 14, 1962

INVENTOR.
JEARLD L. HUTSON
BY
Giles C Clegg Jr

United States Patent Office 3,210,571
Patented Oct. 5, 1965

3,210,571

POWER CONTROL CIRCUIT UTILIZING CONTROL RECTIFIERS WITH ADJUSTABLE REACTANCE IN THE GATING CIRCUIT

Jearld L. Hutson, Richardson, Tex., assignor to Hunt Electronics Company, Dallas, Tex., a corporation of Texas Filed May 14, 1962, Ser. No. 194,392
11 Claims. (Cl. 307—88.5)

The present invention relates to power control circuits and more particularly to power control circuits for controlling the power applied to a load from a source of alternating current supply voltage by controlling the switching of semiconductor thyratron type devices from a normally high impedance state to a low impedance state.

A solid state semiconductor device known as the control rectifier is disclosed in U.S. Patent No. 2,877,359 which issued March 10, 1959. The control rectifier is the solid state equivalent of a gas thyratron and exhibits similar characteristics in that it can be switched from a relatively high impedance state to a low impedance state by applying proper bias current to a gate electrode. Control rectifiers have found extensive application in many types of switching circuits and are especially useful for controlling the current flowing through a load.

Many methods have been proposed for controlling the switching action of a control rectifier to control the amount of current flowing through a load. Most often, these control networks have utilized some type of phase control in which the firing signal applied to the gate electrode is delayed a predetermined amount to cause the control rectifier to conduct for the desired portion of the half cycle and thereby control the effective value of the current flowing through the load.

In general, the prior art methods for controlling the control rectifier involve the use of transformers to obtain the necessary isolation between the phase of the firing signal and the applied line voltage. In many instances, it has been proposed that additional devices be utilized to generate the firing signal.

According to the present invention, a very simple and inexpensive circuit is provided for achieving control of the power applied to the load. Half wave power control is obtained when a single control rectifier is used and full wave power control is obtained by utilizing a single bilateral device or two oppositely poled control rectifiers connected in parallel.

Control of the conduction time of the control rectifiers is achieved by varying the inductive reactance of the gate circuit.

According to one embodiment of the invention which provides full wave power control, a variable inductor connected between the gate electrodes comprises the control circuit. When power is applied across the devices, substantially full line voltage will be applied to the gate electrodes due to the very low breakdown voltage of the P-N junction between the cathode and the gate region of each device. The gate current that flows initially is less than that required to bias the devices to cause switching to the low impedance state. As the inductor begins to saturate, the gate current increases causing one of the devices to switch to the low impedance state and conduct.

The conduction time of the device can be controlled by varying the inductance of the inductor. Thus, if the inductor has a very low inductance, the current flowing through the gate electrodes will increase to a sufficient value to trigger the device to the on condition very quickly thereby allowing conduction for substantially a complete half cycle of applied line voltage. On the other hand, if the inductance of the inductor is large, the time required for the gate current to increase to a value sufficient to switch the device from the high impedance state to the low impedance state can be made substantially equal to a period of complete half cycle making the effective value of current flowing through the load so low as to be insignificant. Thus, complete control of two oppositely poled control rectifiers can be achieved by the use of a single variable inductor as contrasted with the sometimes complicated circuits proposed in the prior art.

In accordance with the second embodiment of the invention, provision is made for achieving control without necessity for providing a variable inductor by providing a capacitor of the proper size in series with the inductor. A variable resistor is connected in parallel with the capacitor for achieving the desired control of the gate current. When the resistor is adjusted to have a high resistance, the reactance of the capacitor will substantially balance the reactance of the inductor allowing the rise in gate current to be limited only by the D.C. resistance of the inductor. As the resistance of the variable resistor is decreased, the capacitor will be shunted and the reactance of the inductor will be effective to delay the rise in gate current. At such time as the resistance of the variable resistor is decreased to substantially zero, the capacitor will be effectively shorted and the rise in gate current will be limited to the full extent provided by the reactance of the inductor.

Many objects and advantages of the invention will become apparent to those skilled in the art as the following detailed description of the same unfolds when taken in conjunction with the appended drawings wherein like reference characters denote like parts and in which;

FIGURE 2A is a plot of voltage against time showing the wave form of the normally available A.C. voltage;

Figure 3:
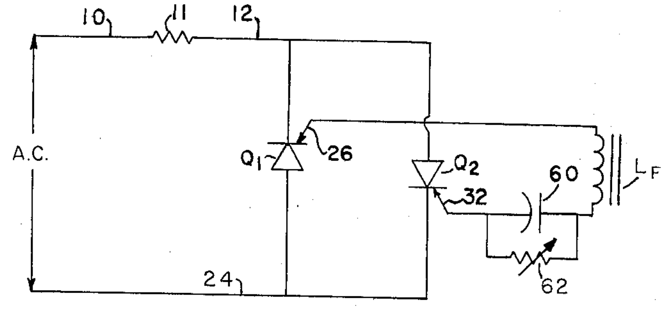
Figure 4:
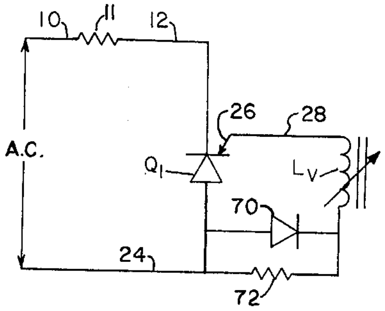

FIGURE 3 is a schematic diagram illustrating a second embodiment of the invention in which a pair of oppositely poled control rectifiers are controlled by an alternate method adjusting the reactance in the circuit connecting the gate electrodes of the devices; and FIGURE 4 is a schematic diagram illustrating the manner in which the present invention may be used for controlling a single control rectifier to achieve half wave power control.

Figure 1:
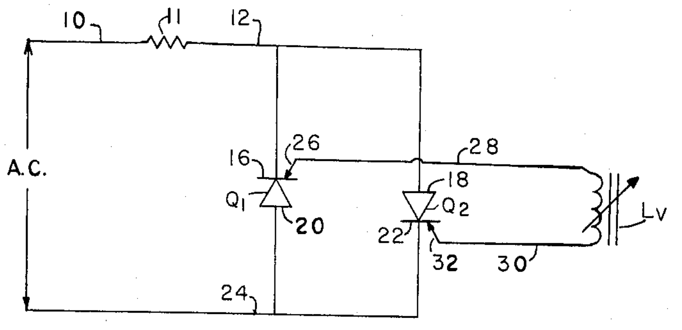
FIGURE 1 is a schematic diagram illustrating one embodiment of the invention in which a variable inductor is utilized to achieve full wave control of the conduction of current through two oppositely poled control rectifiers.

Turning now to FIGURE 1 of the drawings, a source of line potential is applied to a load 11 by a lead 10. The other side of the load 11 is connected by lead 12 to the cathode 16 of a first control rectifier $Q_1$ and to the anode 18 of a second control rectifier $Q_2$. The anode 20 of the device $Q_1$ and the cathode 22 of the device $Q_2$ are each connected to the source of line voltage by lead 24. The gate electrode 26 of the device $Q_1$ is connected to one side of the variable inductor $L_V$ by lead 28. The other side of the variable inductor $L_V$ is connected by lead 30 to the gate electrode 32 of device $Q_2$.

Figure 1A:
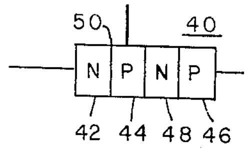
FIGURE 1A illustrates a control rectifier suitable for use in practicing the invention.

In FIGURE 1A there is illustrated a typical four layer silicon PNPN control rectifier 40. It includes an N-type cathode 42, a P-type gate region 44 and a P-type anode 46. The P-type gate region 44 and the P-type anode region 46 are separated by an N-type region 48. The P-N junction 50 between the cathode 42 and the gate region 44 is similar in characteristics to the P-N junction which separates the emitter from the base region of a transistor and is characterized by having a low reverse breakdown voltage characteristic of, for example, 7 volts. The forward breakdown voltage is, of course, much less and may be in the order of 1 or 2 volts.

When line voltage is applied to the lines 10 and 24 of the circuitry illustrated in FIGURE 1, the P-N junction positioned between the cathode and the gate region of each of the devices $Q_1$ and $Q_2$ will each break down applying substantially full line voltage to the variable inductor $L_V$. During positive half cycles, that is those half cycles in which line 10 is positive with respect to line 24, gate current will flow through the inductor $L_V$ of proper phase to bias the device $Q_2$ to cause it to switch from its normally high impedance state to its low impedance state.

Figure 2B:
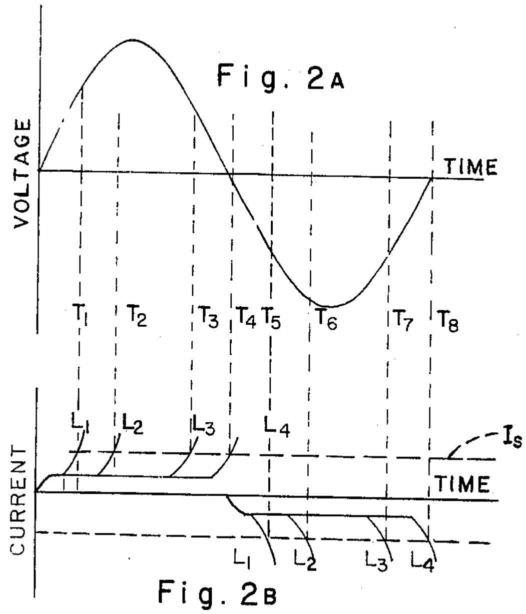
FIGURE 2B is a plot of current against time employing the time coordinant of FIGURE 2A showing a family of curves obtained as the variable inductor utilized in practicing the present invention is varied.

The manner in which varying the inductance of the variable reactor $L_V$ controls the conduction time of the devices $Q_1$ and $Q_2$ to control the effective power applied to the load L can perhaps best be understood with reference to FIGURES 2A and 2B.

The wave form shown in FIGURE 2A is recognized as the sine wave which characterizes the conventional A.C. voltage that is usually utilized as a source of power. FIGURE 2B shows a family of curves in which current is plotted against time for various values of inductance as the variable reactor $L_V$ is varied. It is observed that the time coordinant of the curve 2B is the same as the time coordinant of FIGURE 2A.

With substantially full line voltage applied to the inductor $L_V$, the current flowing through the inductor $L_V$ at a particular time will be dependent on its inductance. Due to the reactance of its inductance, when voltage is first applied, the current which flows will be at a relatively low level until the inductor begins to saturate. As the saturation point is reached, the current will begin to increase very rapidly.

FIGURE 2B illustrates the manner in which the time required for the inductor $L_V$ to saturate and allow appreciable current to flow depends upon the value of the inductance. Thus, if the inductance of the inductor $L_V$ is adjusted to relatively low value of $L_1$, saturation will be reached very soon in the positive half cycle and at time $T_1$ the current flowing through the inductor $L_V$ will attain the value $I_s$ sufficient to cause the device $Q_2$ to switch from its high impedance state to its low impedance state and allow current to flow through the load 11.

As the device $Q_2$ switches to its low impedance state, the voltage across the inductor $L_V$ will decrease and become approximately equal to the forward voltage drop of the device $Q_2$. The forward voltage drop across the device $Q_2$ is characteristically low allowing the inductor $L_V$ to again become unsaturated. The current flowing through the load 11 and the device $Q_2$ will be sufficient to maintain the device $Q_2$ in its low impedance state until substantially the end of the positive half cycle.

If the inductance of the inductor $L_V$ is increased to value $L_2$, sufficient bias current would not flow until time $T_2$ at which time the device $Q_2$ would then switch to the high impedance state. If the inductance of inductor $L_V$ is increased to a value $L_4$, the gate current flowing through the inductor $L_V$ will not attain sufficient magnitude during the positive half cycle to cause the device $Q_2$ to switch to its high to low impedance state.

During negative half cycles, the current flowing through the inductor $L_V$ will flow in a direction to bias the device $Q_1$ to cause it to switch from the high impedance state to the low impedance state. Thus, if the inductor $L_V$ is set to have an inductance of $L_1$ at time $T_5$ the device $Q_1$ will switch to the low impedance state allowing current to flow through the load 11.

From the above, it is evident that by the use of a single variable inductor complete full wave power control of two oppositely poled parallel connected control rectifiers can be achieved. The advantages of this system and its simplicity is believed obvious when the complexity of many of the prior art circuits is considered.

The preciseness of the control obtained depends to some extent upon the core of the inductor. Thus, if the core of the inductor is of a material having a substantially "square" hysteresis loop, excellent control is obtained. If air or low permeability material is used the hysterisis curve will be more rounded and the switching time may vary slightly from cycle to cycle.

Another embodiment of the invention is illustrated in FIGURE 3. The embodiment of the invention shown in FIGURE 3 utilizes a variable resistance 62 to control the reactance of the circuit connected to the two gate electrodes 26 and 32 allowing somewhat less inexpensive components to be used. The circuitry of FIGURE 3 is quite similar to that of FIGURE 1, the differences being that an inductor $L_f$ having a fixed value of inductance is utilized rather than a variable inductor $L_V$ and a capacitor 60 is connected in series with the inductor $L_f$. The variable resistor 62 is connected in parallel with the capacitor 60.

The operation of the circuitry shown in FIGURE 3 is, insofar as the control of the devices $Q_1$ and $Q_2$ is concerned, is the same as that described with reference to FIGURE 1. The principal difference between the two embodiments of the invention is that rather than control the reactance of the gate bias circuit by varying the inductance of the inductor, the effective reactance of the gate bias circuit is varied by controlling the degree to which the reactance of capacitor 60 affects the circuit. If the resistor 62 is adjusted to have a very high resistance, and the capacitor 60 and inductance $L_f$ are resonant or near resonant at the frequency of the applied line voltage, the effective impedance of the gate bias circuit will be the D.C. resistance of the inductor and the device $Q_2$ will begin to conduct very early in the positive half cycle. As the resistance of the variable resistor 62 is decreased, it is effective to shunt the capacitor 60 and thereby increase the inductive reactance of the gate bias circuit and thereby increasing the time required for the current flowing in the bias circuit to achieve a sufficient level to bias the device $Q_1$ or $Q_2$ to the low impedance state. At such time as the resistor 62 is adjusted to have near zero resistance, the capacitor 60 will be completely shunted. If the inductance of the inductor $V_f$ is equal to $L_4$, it is evident from the above discussion that neither of the devices $Q_1$ and $Q_2$ will ever be switched to the low impedance state and, therefore, the only current which will flow through the load 11 will be the leakage current flowing in the gate bias circuit. The leakage current will be so low as to be virtually insignificant.

In FIGURE 4, the manner in which the present invention may be utilized to achieve half wave control of the power flowing through a load by utilizing only the device $Q_1$ is illustrated. As shown in FIGURE 4, the gate electrode 26 of the device $Q_1$ is connected directly to the variable inductor $L_V$ by lead 28. The other side of the inductor $L_V$ is connected through a diode 70 to the anode of the device $Q_1$. A resistor 72 is connected in parallel with the diode 70. During negative half cycles, the rectifying junction of the diode 70 will have a very low forward breakover voltage and the device $Q_1$ will switch to the low impedance state at a time depending on the inductance of the inductor $L_V$. The reverse breakdown voltage of the diode 70 is much higher than the applied line voltage and during positive half cycles the only current flowing through the inductor $L_V$ is that shunted around the diode 70 by the resistor 72. The resistor 72 must be chosen to have a sufficiently low resistance to allow the inductor $L_V$ to become de-saturated but must be high enough to prevent damage to the inductor $L_V$ by excessive current as the inductor $L_V$ becomes saturated during positive half cycles.

Although the invention has been described with regard to particular preferred examples and embodiments of the same, many changes and modifications will become obvious to those skilled in the art in view of the foregoing description. The invention is, therefore, intended to be limited only as necessitated by the scope of the appended claims and not to what has been shown herein.

What I claim is:

1. A power control circuit for controlling the effective power applied to a load from a source of alternating current supply voltage that comprises a thyratron type device having a cathode, an anode and a gate electrode, said device being capable of being switched from a normally high impedance state to a low impedance state between said cathode and anode responsive to the gate current flowing in said gate electrode attaining a predetermined level, means for connecting said device in series with a load and a source of alternating current supply voltage by said anode and cathode, impedance means including a variable inductor having an inductive reactance connected in series with said gate electrode for controlling the time required for said current flowing in said gate electrode to attain said predetermined level and thereby control the effective power applied to said load in accordance with the inductive reactance of the variable inductor, the inductive reactance of said variable inductor being settable at a value to attain a desired effective power across said load.

2. A power control circuit for controlling the effective power applied to a load from a source of alternating current supply voltage that comprises a thyratron type device having a cathode, an anode and gate electrode, said device being capable of being switched from a normally high impedance state to a low impedance state between said cathode and said anode responsive to the gate current flowing in said gate electrode attaining a predetermined level, means for connecting said device in series with a load and a source of alternating current supply voltage by said cathode and said anode, an inductor, a capacitor, means connecting said capacitor and said inductor in series circuit with said gate electrode, and means for varying the capacitive reactance of said series circuit to control the time required for the current flowing in said gate electrode to attain said predetermined level and thereby control the effective power applied to said load.

3. A power control circuit as defined in claim 1 wherein said device is capable of being switched to the low impedance state only during half cycles of the applied line voltage when the anode of said device is positive with respect the cathode of said device further including rectifier means connected to allow flow of gate current when said anode is positive and prevent flow of gate current when said anode is negative.

4. A power control circuit as defined in claim 3 further including resistive means connected in shunt with said rectifier means.

5. A power control circuit for controlling the effective value of current flowing through a load from a source of alternating current supply voltage that comprises a thyratron type semiconductor device, said device including a cathode, an anode and a gate electrode, said device being capable of being switched from a normally high impedance state to a low impedance state responsive to the gate current flowing into said gate electrode attaining a predetermined level, means for connecting said device in series with a load and a source of alternating current supply voltage, an inductor, a rectifier, means connecting said inductor and said rectifier in series between said gate electrode and said anode, and a resistor connected across said rectifier, the inductance of said inductor controlling the time required for said gate current to attain said predetermined level, said resistor being of sufficiently high resistance to prevent excessive gate current during half cycles of the applied power in which said rectifier prevents flow of gate current and being of sufficiently low resistance to allow said inductor to discharge during half cycles in which said rectifier allows flow of gate current.

6. A power control circuit as defined in claim 5 further including means to vary the inductive reactance of the circuit in which gate current flows thereby varying the time required for said gate current to attain said predetermined level.

7. In combination, a source of alternating current voltage supply, a load, switching means connected in series with said voltage supply and said load for controlling the flow of current through said load, said switching means including a first gate electrode and a second gate electrode impedance means including an inductor having an inductive reactance, means connecting said first gate electrode, said second gate electrode and said impedance means to define a gate circuit, said switching means being switched to a low impedance state responsive to the current flowing in said gate circuit attaining a predetermined level, the inductive reactance of said impedance means being effective to control the time required for current flowing in said gate circuit to attain a level sufficient to cause said switching means to switch from a normally high impedance state to a low impedance state in at least one direction.

8. The combination defined in claim 7 wherein said switching means comprises two oppositely poled control rectifiers connected in parallel.

9. The combination as defined in claim 8 wherein said inductor is a variable inductor.

10. The combination as defined in claim 8 wherein said impedance means further includes, a capacitor connected in series with said inductor and said first and second gate electrodes and means for varying the capacitive component of said impedance means to thereby vary the inductive reactance of said gate circuit.

11. A power control circuit that comprises a first control rectifier and a second oppositely poled control rectifier connected in parallel with said first control rectifier, each of said control rectifiers having a gate electrode, an inductor, means connecting said inductor between the gate electrode of said first control rectifier and the gate electrode of second control rectifier to define a gate circuit means for connecting said parallel connected rectifiers in series with a load and a source of alternating current supply voltage, and means to vary the inductive reactance of said gate circuit, said inductive reactance being effective when said circuit is connected to a source of alternating current supply voltage to control the time required for current flowing in said gate circuit to attain a level sufficient to cause one of said devices to switch to the low impedance state from a normally high impedance state and thereby control the effective power applied to said load.

References Cited by the Examiner

UNITED STATES PATENTS

| | | | |
|---|---|---|---|
| 2,981,880 | 4/61 | Momberg et al. | 307—88.5 X |
| 3,018,383 | 1/62 | Ellert | 307—88.5 |
| 3,103,618 | 9/63 | Slater | 307—88.5 X |

OTHER REFERENCES

Manteuffel: "Improved Magnetic Voltage Stabilizer Employing Silicon-Controlled Rectifiers," International Solid-State Circuits Conference, Feb. 15, 1961.

Silicon Controlled Rectifier Manual, General Electric Co., second edition, Dec. 29, 1961.

JOHN W. HUCKERT, *Primary Examiner.*

ARTHUR GAUSS, *Examiner.*